March 10, 1959   K. LEHOVEC   2,877,391
RECTIFYING DEVICE
Filed June 25, 1953
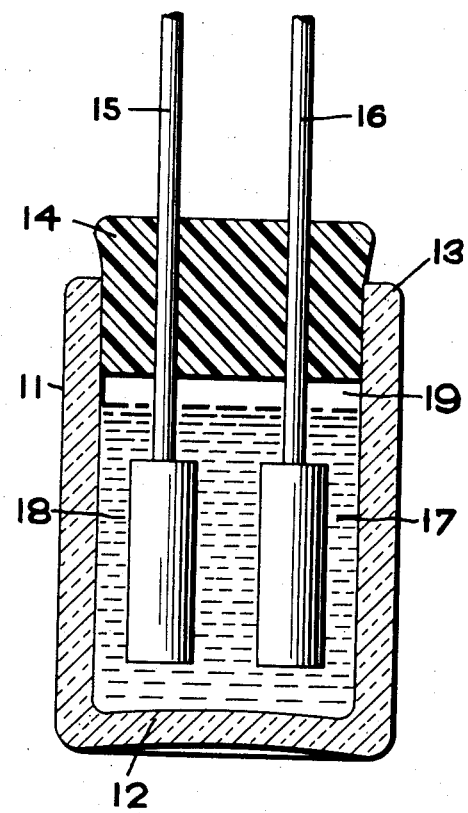
INVENTOR.
KURT LEHOVEC
BY
Connolly and Hutz
HIS ATTORNEYS 2,877,391
Patented Mar. 10, 1959

2,877,391
RECTIFYING DEVICE

Kurt Lehovec, Williamstown, Mass., assignor to Sprague Electric Company, North Adams, Mass., a corporation of Massachusetts Application June 25, 1953, Serial No. 364,007

4 Claims. (Cl. 317—233)

The present invention relates to a new and improved type of rectifying device for use with electronic equipment.

The problem of rectifying an A. C. current has been present in the electrical industry virtually from the initial work on A. C. currents by Nicholas Tesla. Among the devices suggested for this purpose are aluminum oxide rectifiers utilizing a liquid electrolyte, various constructions employing a point contact against a semi-conductive crystal, mercury droplets positioned against a crystal of the same type, vacuum tubes, synchronous meters, and other similar and related constructions.

In many of these devices, the rectifying system may be viewed as consisting of an insulator positioned between two dissimilar electrodes. From one of these electrodes, electrons or holes can be considered as emitted into the insulator making it conductive in nature. From the other electrode, no carriers can be emitted into this same insulating layer. The first category of electrode mentioned is usually termed the emitter electrode. It must possess electrons or holes which can relatively easily enter into the insulator. With any of the prior constructions utilizing this type of a rectifying system, there are various problems in forming satisfactory emitter electrodes in contact with the insulating layer. The older aluminum oxide rectifiers were limited quite decidedly in their temperature range of operation by virtue of the volatility of the solvent employed in the electrolyte. With point contact electrodes, there is frequently a considerable problem due to noise, as well as problems relating to current carrying capacity. Frequently, the point probes used are rather delicate and easily damaged either during production, handling, or even use. The mercury point contacts indicated are reasonably satisfactory, but by virtue of the expense involved, are not considered extremely practical.

It is an object of the present invention to produce a new type of a rectifying device which overcomes many of the indicated disadvantages of the prior art types of rectifying constructions. Further objects of the invention, as well as the advantages of it, will be more clearly indicated from the balance of this specification, the appended claims, as well as the accompanying drawing in which:

There is illustrated diagrammatically a new rectifying device of the instant invention.

Briefly, the above aims are achieved by employing as the emitter electrode in a rectifying device a solution of a metal in either ammonia, methylamine, or ethylamine. Obviously, these electrolytes should be kept within a sealed container in order to reduce the loss of solvent by volatilization, and with more volatile solutions this container should be rugged enough to withstand the pressure required to keep the solvent in liquid form.

Perhaps the invention will be best illustrated with reference to the drawing in which there is shown a new rectifying device 11 of the invention as consisting of an outer retaining cylindrical glass bottle-like container 12 sealed at its top open extremity 13 by an appropriate inert dielectric sealant 14 of polytetrafluoroethylene or the like through which electrodes 15 and 16 project into the center cavity 17 of the glass container 12. This cavity is filled with a liquid electrolyte 18 as will be more fully explained below. The electrode 15 is preferably formed of an inert material, such as for example, platinum or the like, whereas the electrode 16 is preferably formed of a metal upon the surface of which has been placed an insulating layer having rectifying properties. Suitable metals falling within the latter category are the well-known valve metals, aluminum, zirconium, tantalum, and the like. The electrode 16 can be formed with an insulating oxide layer, in any of the ways known to the art, such as for example, aluminum being formed to 600 volts in concentrated boric acid solution with an initial starting current of 40 amperes per square centimeter.

Obviously, the various elements shown in the diagrammatic construction of the drawing may be replaced with other equivalent means which will readily suggest themselves to the art. For example, the electrode 16 may consist of an elongated foil wound or pleated as desired so as to obtain high volumetric efficiency. Also, the container can be formed of metal that is used as the electrode 15.

This concept is directly concerned with the electrolyte employed with such systems. As is shown by the work by Kraus reported in the Journal of the American Chemical Society, 29,1557 (1907); 30,1323 (1908); 43,749 (1921); and in Chemical Reviews, 8,251 (1931); 26,95 (1940) a number of metals, such as for example, sodium, potassium, lithium, and to a lesser extent the alkaline earth metals, such as calcium, strontium, and barium are soluble in liquid ammonia yielding liquid electrolyte systems which conduct by means of electrons. Other metals, such as for example, magnesium, aluminum, beryllium, zinc, gallium, lanthanum, cerium, and manganese are also soluble in this solvent. Such solutions as used with the invention preferably contain as large a proportion of metal as possible in order that they may exhibit as high a conductivity as possible. The alkali metals, lithium, sodium, and potassium dissolve readily in anhydrous methylamine and to a lesser extent in ethylamine forming electrolytes which are acceptable for use with the invention. Surprisingly enough, the same metals are substantially insoluble in other primary, secondary, and tertiary amines, limiting the solvents for use with the invention to liquid ammonia, methylamine, and ethylamine. Because of the conductivity of their solutions, as well as their ease of solubility, the preferred electrolytes for use in rectifying systems of the invention are saturated with the alkali metals, sodium, potassium, and lithium.

With the new rectifiers of the invention, care must be taken that the electrolyte container is sufficiently strong to withstand the vapor pressure of the solvent employed. Such constructions can easily be accomplished by the use of steel and other containers of the type known to the art. Frequently, it is desirable to leave a small air space, such as a space 19 shown in the drawing to provide for a limited amount of vaporization of the solvent. At other times, an appropriate valve member may be used to prevent pressures building up within the rectifier, which would tend to cause an explosion.

It is contemplated that further development work will prove the utility of the electrolytes used herein with devices which are not per se rectifiers. Such devices include various A. C. electrolytic capacitors and related apparatus.

As many apparently widely different embodiments of my invention may be made without departing from the spirit and scope hereof, it is to be understood that my invention is not limited to the specific embodiments hereof except as defined in the appended claims.

What is claimed is:

1. A rectifier comprising a non-aqueous solution having electronic conductance, two electrodes immersed in said solution, one of said electrodes having an in-situ formed oxide film on its immersed surface, the other of said electrodes being essentially inert, said solution comprising a metal dissolved in a member of the class consisting of liquid ammonia, methylamine, and ethylamine.

2. A device as defined in claim 1 wherein said metal is selected from the group consisting of sodium, potassium, and lithium.

3. In an electronic rectifier, the improvement which comprises a non-aqueous solution having electronic conductance, and two electrodes, at least one of said electrodes being provided with a rectifying layer, said solution comprising a metal dissolved in a solvent selected from the group consisting of ammonia, methylamine, and ethylamine.

4. A two-electrode electronic rectifier comprising a valve metal as one electrode, an in situ formed non-conducting film on said one electrode, a non-aqueous solution of a metal dissolved in a member of the class consisting of liquified ammonia, methylamine, and ethylamine serving as the other electrode, and inert conducting means associated with said other electrode.

References Cited in the file of this patent

UNITED STATES PATENTS

| | | |
|---|---|---|
| 1,326,297 | Slepian | Dec. 30, 1919 |
| 1,526,127 | Flick | Feb. 10, 1925 |
| 1,637,795 | Andrews | Aug. 2, 1927 |
| 2,014,169 | Edelman | Sept. 10, 1935 |
| 2,036,669 | Yngve | Apr. 7, 1936 |